US009923997B2

United States Patent

(12) United States Patent
Pettersson et al.

(10) Patent No.: US 9,923,997 B2
(45) Date of Patent: Mar. 20, 2018

(54) SYSTEMS AND METHODS FOR PACKET CLASSIFICATION

(71) Applicant: Telefonaktiebolaget L M Ericsson (publ), Stockholm (SE)

(72) Inventors: Sten Pettersson, Torslanda (SE); Per Andersson, Montreal (CA); Anders Franzen, Trangsund (SE); Tarik Hammam, Kista (SE); Bengt Johansson, Vastra Frolunda (SE); Jon Maloy, Montreal (CA); Tord Nilsson, Bohus-Bjorko (SE); Richard Tremblay, Rosemere (CA); Abdallah Chatila, Verdun (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 435 days.

(21) Appl. No.: 14/136,950

(22) Filed: Dec. 20, 2013

(65) Prior Publication Data

US 2014/0226466 A1 Aug. 14, 2014

Related U.S. Application Data

(60) Provisional application No. 61/745,022, filed on Dec. 21, 2012.

(51) Int. Cl.

*H04L 29/06* (2006.01)
*H04L 12/801* (2013.01)

(Continued)

(52) U.S. Cl.

CPC ............ *H04L 69/22* (2013.01); *H04L 43/028* (2013.01); *H04L 47/12* (2013.01); *H04L 47/125* (2013.01);

(Continued)

(58) Field of Classification Search

CPC ..... H04L 69/22; H04L 63/1416; H04L 67/10; H04L 47/12; H04L 47/125;

(Continued)

(56) References Cited

U.S. PATENT DOCUMENTS 6,977,930 B1 * 12/2005 Epps .................. H04L 12/5693 370/392
2006/0230407 A1 * 10/2006 Rosu .................. G06F 9/5088 718/105

(Continued)

*Primary Examiner* — Noel Beharry
*Assistant Examiner* — Ruihua Zhang
(74) *Attorney, Agent, or Firm* — Rothwell, Figg, Ernst & Manbeck, p.c.

(57) ABSTRACT

A method for packet classification. In some embodiments, the method includes instantiating a first machine; allocating a first SC to the first machine, the first SC being configured to classify a packet based on information contained in a field of a header included in the packet; instantiating a second machine; allocating a second SC to the second machine, the second SC being configured to classify a packet based on information contained in a field of a header included in the packet; monitoring the first machine to detect if the first machine is in an overload state; and in response to detecting that the first machine is in an overload state, instantiating a third machine and allocating a third SC to the third machine, the third SC being configured to classify a packet based on information contained in a field of a header included in the packet.

19 Claims, 19 Drawing Sheets

(51) Int. Cl.
*H04L 12/803* (2013.01)
*H04L 12/26* (2006.01)
*H04L 29/08* (2006.01)

(52) U.S. Cl.
CPC ...... *H04L 67/1029* (2013.01); *H04L 67/1031* (2013.01)

(58) Field of Classification Search
CPC . H04L 67/1031; H04L 67/1029; H04L 43/28; H04L 29/08153–29/08297
See application file for complete search history.

(56) References Cited

U.S. PATENT DOCUMENTS

2010/0150158 A1* 6/2010 Cathey ................ H04L 47/2441 370/392
2010/0250734 A1* 9/2010 Ajiro ..................... G06F 9/5077 709/224
2013/0201989 A1* 8/2013 Hu .......................... H04L 45/24 370/392
2014/0136858 A1* 5/2014 Jacobson .................. G06F 9/46 713/300

* cited by examiner

800

SYSTEMS AND METHODS FOR PACKET CLASSIFICATION

CROSS-REFERENCE TO RELATED APPLICATIONS

This application claims the benefit of provisional patent application No. 61/745,022, filed on Dec. 21, 2012, which is incorporated by reference.

TECHNICAL FIELD

The disclosure relates to the field of packet classification.

BACKGROUND

A packet classifier is a module—either hardware or software—that classifies a packet by inspecting one or more fields of the packet. Typically, a packet classifier classifies a packet by examining fields in one or more headers of the packet. The packet classifier may also determine an action to be performed on the packet based on the determined classification.

Currently, packet classifiers are either implemented in hardware using highly specific devices, such as a ternary content addressable memory (TCAM), or implemented in software. Packet classification is commonly performed in several important network devices, such as switches, routers and load-balancers.

A packet classifier ("classifier" for short) can become a bottle-neck if the packets to be processed by the classifier are arriving at the classifier at a rate that is faster than the rate at which classifier can process a packet. For example, on a 10 Giga bit per second (Gbit/sec) line, the time between minimal—64 octet—packets is approximately 50 nanoseconds. Thus, if the amount of time it takes a classifier to process a packet is greater than 50 nanoseconds, then packets may end up being dropped. A solution to this problem is to increase the computing power of the classifier. But this can be expensive.

SUMMARY

Because it can be quite costly to solve the bottleneck problem described above by increasing the computing power of the classifier, other solutions are desired.

One such solution is to introduce parallelism into the packet classification process. One way to introduce parallelism into the packet classification process is to employ two or more classifiers 102 and a load balancer 104 to balance the packet traffic among the two or more classifiers 102. This is shown in FIG. 1.

Another solution is to divide a conventional classifier into two or more independent sub-classifiers (SCs), each of which can execute on a separate machine, and pipeline the sub-classifiers together (i.e., each SC solves a subset of the classification problem). This is shown in FIG. 2, which shows n number of pipelined SCs 202. Together, the SCs 202 solve the entire problem. Additionally, we can combine both solutions (parallelism and pipelining) as shown in FIG. 3.

These above solutions work well as long as the workload and/or classification does not change very often, since it requires work to install new hardware and also the task of dividing the classification algorithm into smaller parts involve human intervention. Problems, however, arise in a flexible environment, such as in a cloud and/or virtualized data-center environment, where both the workload and the needs of the users of the classifier can change rapidly. Nowadays, in a cloud environment, machines can be instantiated by the press of a button. Therefore, one must over-provision the classifier to be able to cope with the maximum demand.

Accordingly, this disclosure describes systems and methods by which a classifier can be divided algorithmically into smaller and/or parallel instances. Thus allowing a classifier to shrink and grow according to the needs of the user. The division algorithm can furthermore be automated to allow a completely flexible deployment of the classifier. This gives us a classifier that can grow or shrink as the throughput demands and/or complexity changes. Hence, we have a classifier that fits perfectly into a cloud based and/or virtualized data-center environment while still being adequate for static deployments. Also in the case of a static deployment, this systems and methods described herein have an advantage since they can be used to plan the layout of the classifier.

Accordingly, in one aspect, a method for packet classification is provided by this disclosure. In some embodiments, the method may be performed by a controller and comprises: instantiating a first machine (e.g., virtual machine, switch, router, general purpose computer, etc.) and allocating a first sub-classifier (SC) to the first machine, the first SC being configured to classify a packet based on information contained in a field of a header included in the packet. The method further includes instantiating a second machine and allocating a second SC to the second machine, the second SC being configured to classify a packet based on information contained in a field of a header included in the packet. The method further includes monitoring the first machine to detect if the first machine is in an overload state; and in response to detecting that the first machine is in an overload state, instantiating a third machine and allocating a third SC to the third machine (the third SC may be a copy of the first SC), the third SC being configured to classify a packet based on information contained in a field of a header included in the packet.

In some embodiments, the method further comprises the first machine receiving a packet; the first SC processing the packet, wherein the processing comprises classifying the packet and decorating the packet to create a decorated packet; and the first SC providing the decorated packet to the second SC.

In some embodiments, the first SC comprises a fourth SC and a fifth SC, the third SC allocated to the third machine consists of the fifth SC, and the method further comprises de-allocating the fifth SC from the first machine in response to detecting that the first machine is in an overload state.

In some embodiments, the method further comprises instantiating a load balancer in response to detecting that the first machine is in an overload state, wherein the load balancer is configured to balance traffic between the first machine and the third machine, and the third SC allocated to the third machine is a copy of the first SC.

In some embodiments, the method further comprises updating configuration data used by an upstream SC that is upstream with respect to the first SC in response to detecting that the first machine is in an overload state, wherein the configuration data is used by the upstream SC for routing packets to downstream SCs.

In another aspect, a controller for packet classification is disclosed. In some embodiments, the controller is adapted to: instantiate a first machine; and allocate a first sub-classifier (SC) to the first machine, the first SC being configured to classify a packet based on information contained in a field of a header included in the packet. The controller is also adapted to instantiate a second machine; and allocate a second SC to the second machine, the second SC being configured to classify a packet based on information contained in a field of a header included in the packet. The controller is further adapted to monitor the first machine to detect if the first machine is in an overload state; and instantiate a third machine and allocate a third SC to the third machine in response to detecting that the first machine is in an overload state, wherein the third SC is configured to classify a packet based on information contained in a field of a header included in the packet.

In another aspect, a computer program product for packet classification is disclosed. The computer program product comprises a non-transitory computer readable medium storing computer readable program code. In some embodiments, the computer readable program code comprises: code for instantiating a first machine; code for allocating a first sub-classifier (SC) to the first machine, the first SC being configured to classify a packet based on information contained in a field of a header included in the packet; code for instantiating a second machine; code for allocating a second SC to the second machine, the second SC being configured to classify a packet based on information contained in a field of a header included in the packet; code for monitoring the first machine to detect if the first machine is in an overload state; and code for instantiating a third machine and allocating a third SC to the third machine in response to detecting that the first machine is in an overload state, the third SC being configured to classify a packet based on information contained in a field of a header included in the packet.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments.

DETAILED DESCRIPTION

Figure 1:
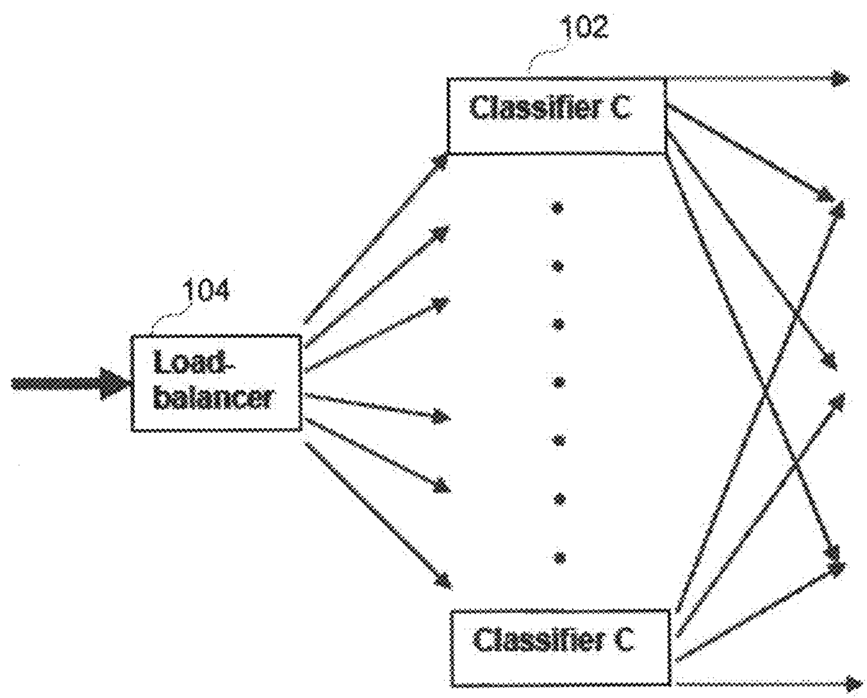
FIG. 1 illustrates a system in which packet traffic is load balanced among a set of packet classifiers.
Figure 2:
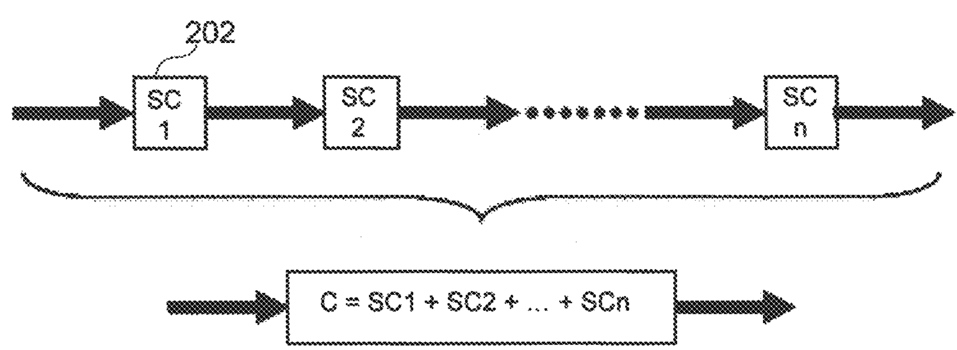
FIG. 2 illustrates a system in which packet classifier are arranged in a pipeline arrangement.

Using predefined parameters, one can algorithmically determine how best to configure a classifier. The predefined parameters may include: (1) the maximum desirable width of a parallelized classifier and (2) the maximum number of computations per unit time that can be performed by a given machine. In some embodiments, there is a maximum width parameter due to the fact that most classifiers require some configuration data that must be duplicated or distributed over the parallel classifiers. This data may also need to be synchronized so that all the classifiers have the same configuration data at the same time. Synchronization time increases as more classifiers are placed in parallel. Hence there may be an upper limit to the number of possible parallel classifiers.

In some embodiments, the first step of the method is to divide a packet classification task into a set of minimal sub-tasks, each of which when combined correctly will perform the original classification task.

Once the minimal sub-tasks are found, a corresponding sub-classifier can be created for each of the sub-tasks. That is, each sub-classifier includes a set of instructions for performing the sub-task with which the sub-classifier corresponds. To keep such a sub-classifier small so that it does not consume more recourses than necessary, the sub-classifier does not perform any other of the sub-tasks.

After creating the sub-classifier (SC), the SC can be allocated to a particular machine (e.g., a computer, a switch, a router, a particular processor). An SC should not require more computing power than is provided by the machine to which it is allocated. The number of sub-classifiers that can be allocated to one machine is determined by many factors. Therefore, one must determine the proper parameters based on both the machines used and the classification method. Additionally, after creating the SCs, some SCs may be combined to create a non-minimal SC.

In some embodiments, prior to allocating an SC to a machine, the SC is modified by adding to the SC a set of instructions for sending packets to the next SC in the pipeline, if any. There are several ways in which to determine to which of the next sub-classifiers in the pipeline is to get the packet. Some of them are: (i) A hash table or other method that selects the next classifier based on information in the packet (this way it is possible to allow packets for a certain user or flow to be sent to a certain classifier instance; therefore, it is possible to divide the internal data-structures of the next level so that each classifier carries its own subset, thus reducing the data size); and (ii) a random or round-robin load balancer (or rather load distributor) sends the packet to any of the classifier instances in the next level, thus giving a more even distribution.

When a packet is processed by an SC, the SC must find the portion of the packet which the SC is configured to parse.

In some embodiments, when an SC provides a packet to a downstream SC, the providing SC may "decorate" the packet (e.g., add a header and/or trailer to the packet (or some portion of the packet) containing meta-data—i.e., information about the packet modify an existing header of the packet to contain meta-data, etc.). In such and embodiment, the downstream receiving SC also needs to parse this meta-data (i.e., the information about the packet). The meta-data my include information identifying a protocol (e.g., IPv4, IPv6, TCP, or UDP) to which a header of the packets conforms, such as the header of the packet that the downstream receiving SC is configured to inspect. The meta-day may further include information identifying the location of a header of the packet, such as the header of the packet that the downstream receiving SC is configured to inspect.

Accordingly, in some embodiments, prior to allocating an SC to a machine, the SC may be further modified by adding to the SC a set of instructions for parsing meta-data added to packets that the SC receives from an upstream SC.

The next sections will give examples of how these principles can be applied to different types of classifiers.

Figure 3:
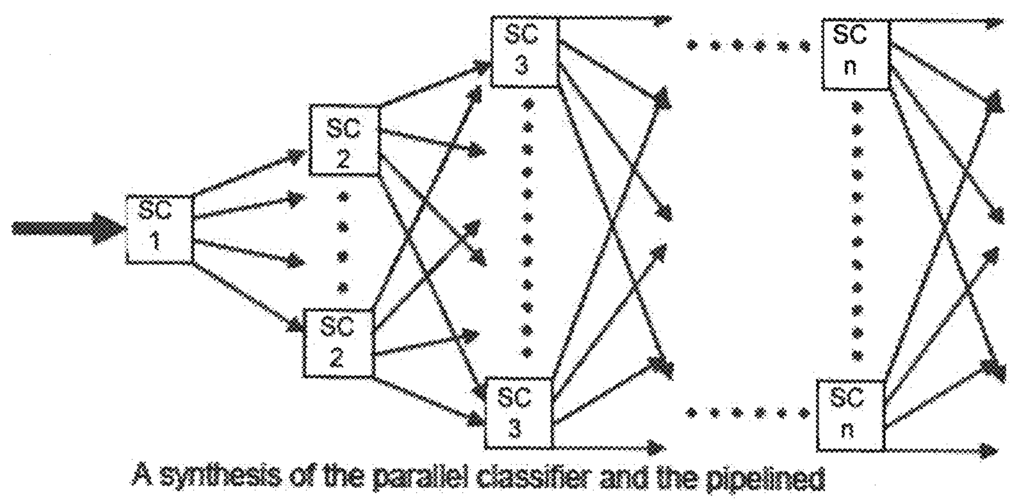
FIG. 3 illustrates packet classifiers arranged in a parallel and pipelined arrangement.
Figure 5:
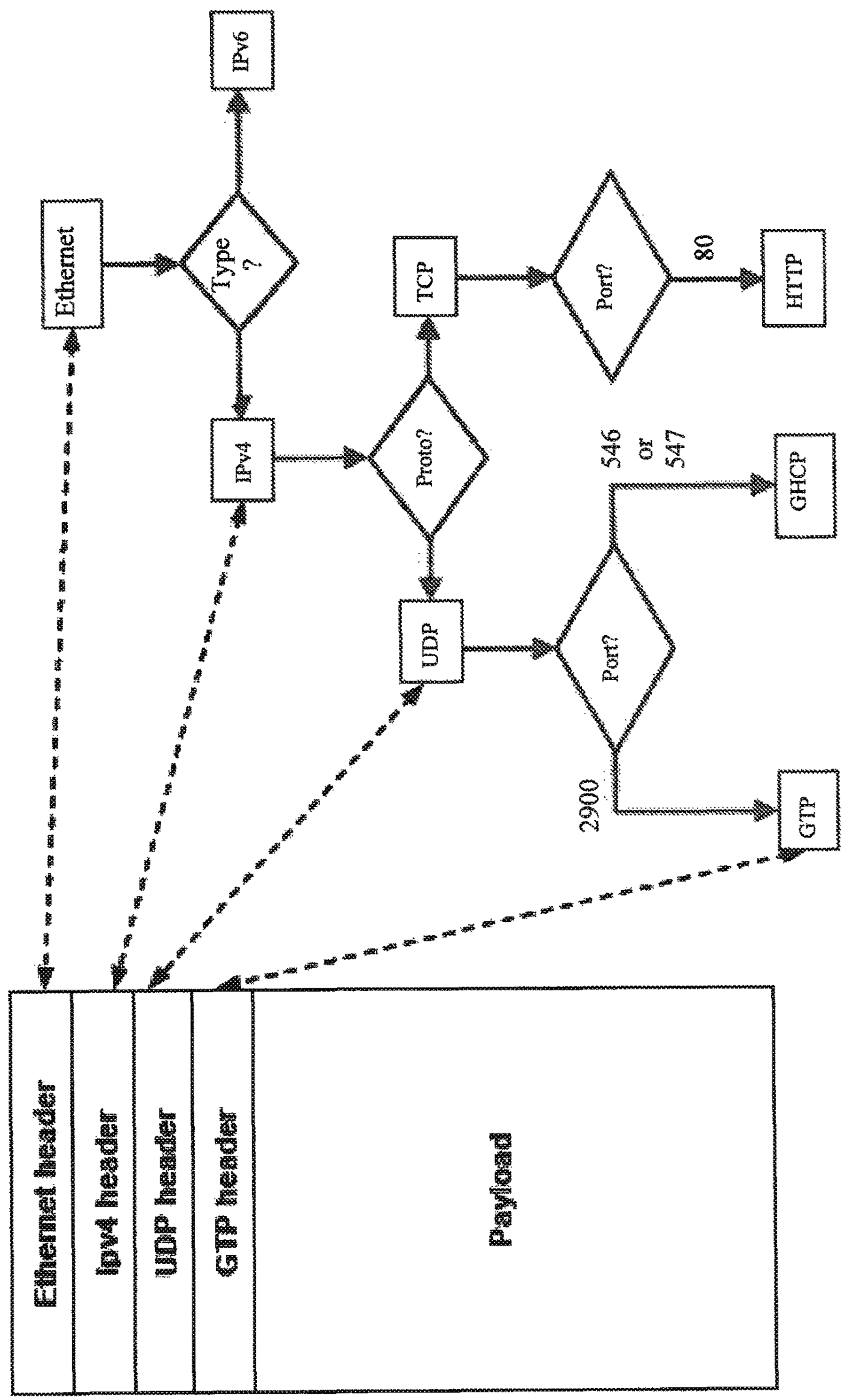
FIG. 5 illustrates an example Ethernet packet that comprises an IP packet that comprises a UDP packet, that comprises a GTP packet.

A Decision-Tree Based Classifier:

In some embodiments, a packet received by the first SC in the SC hierarchy (e.g., SC1 of FIG. 3) comprises a number of protocol headers followed by a packet payload. For example, packets received SC1 of FIG. 3 may include a data link layer protocol header (e.g., an Ethernet header), immediately followed by a network layer protocol header (e.g., IPv4 or IPv6), immediately followed by a transport layer protocol header (e.g., UDP or TCP), which may then be followed by application layer data (e.g., HTTP data). This is illustrated in FIG. 5.

In a decision tree based classifier, packet classification follows a tree of questions (a.k.a., decision tree). However, the name decision tree is not entirely correct because many protocol stacks allow tunneling of one protocol inside another, thus loops may form in the "tree" essentially making it into a graph.

Figure 4:
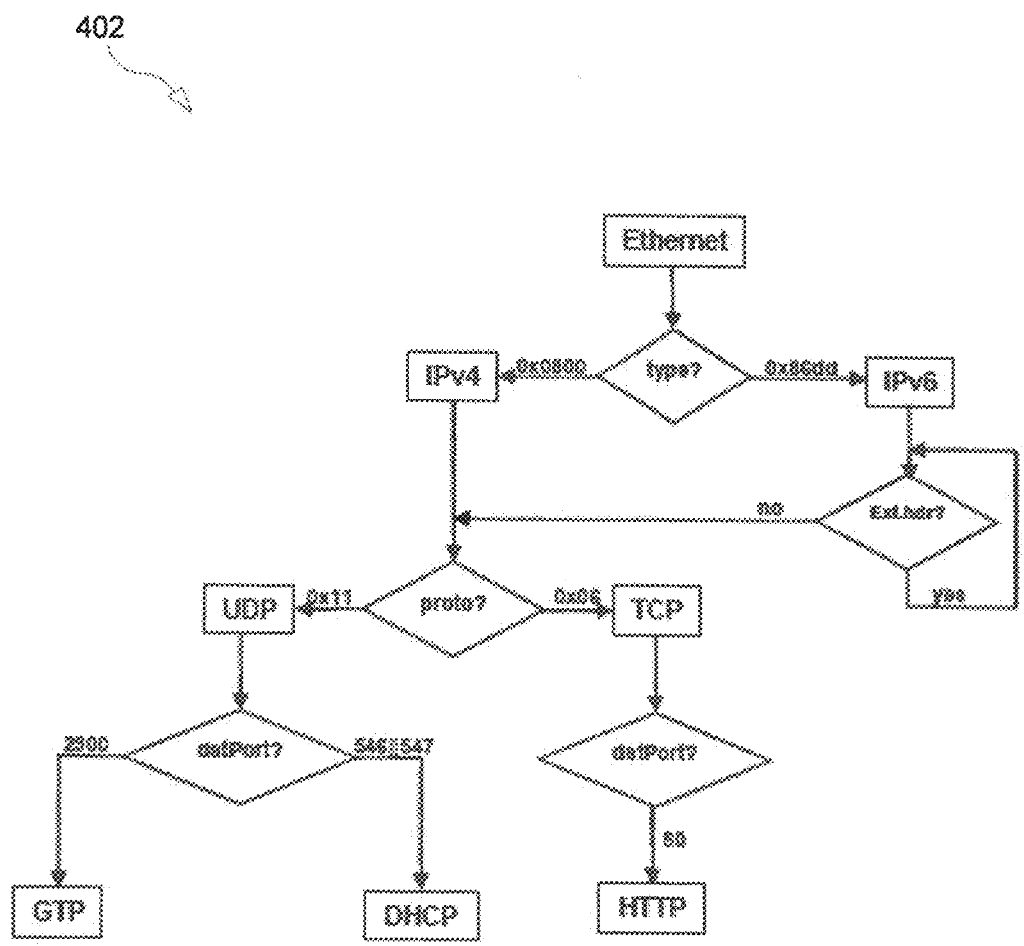
FIG. 4 illustrates an example packet classification decision tree.
Figure 6:
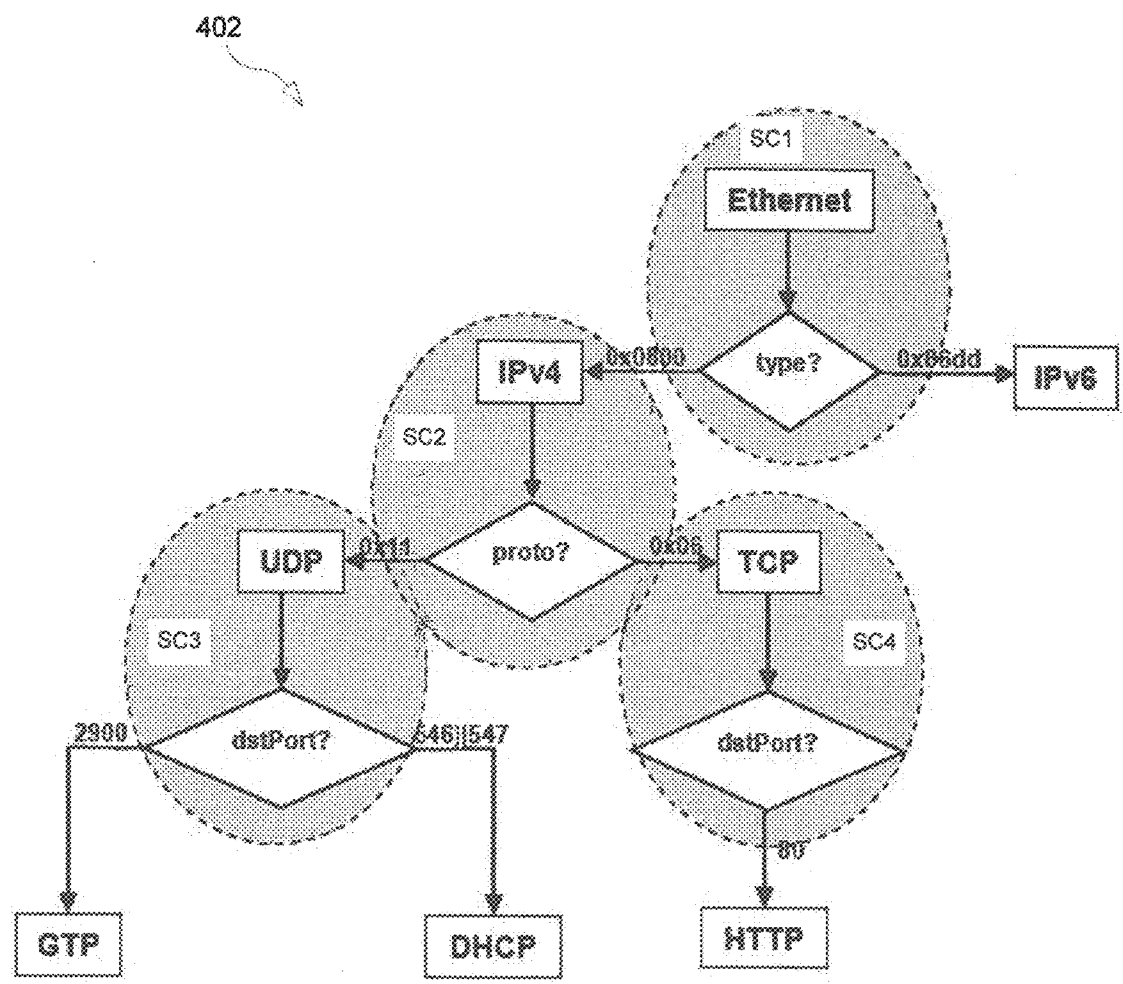
FIG. 6 illustrates mapping sub-classifiers to nodes in the decision tree.

An example tree 402 is illustrated in FIG. 4. As shown in FIG. 4, tree 402 includes a number of decision points 404 (a.k.a., "nodes"). It is possible to divide a classifier in accordance with a decision tree. For example, the smallest sub-classifier may correspond to one single node. As shown in FIG. 6, SCs can be allocated to the different decision nodes of tree 402. In the example shown in FIG. 6, for each protocol layer (e.g., MAC layer, network layer, transport layer, application layer, etc.), one or more SCs parse (e.g., extracts) data from one or more fields of the header corresponding to the protocol layer to determine what type header follows the header that is being examined. Once it is known which protocol comes next (e.g., IPv4 or IPv6), classification continues in the corresponding child node of the current node.

Each header has a particular length—which is either constant or can be deduced from information in the header—and when a new node in the tree is selected, a pointer to the packet is moved beyond the current header. See FIG. 5.

Because protocol stacks allow tunneling of one protocol inside another, thereby forming loops in a decision tree, in some embodiments, we make each node or cluster of looping nodes into one sub-classifier. However, this method may cause problems because, for each division, the traffic lessens until—at the leaf nodes of the tree—each classifier will not utilize the underlying hardware properly.

Figure 7:
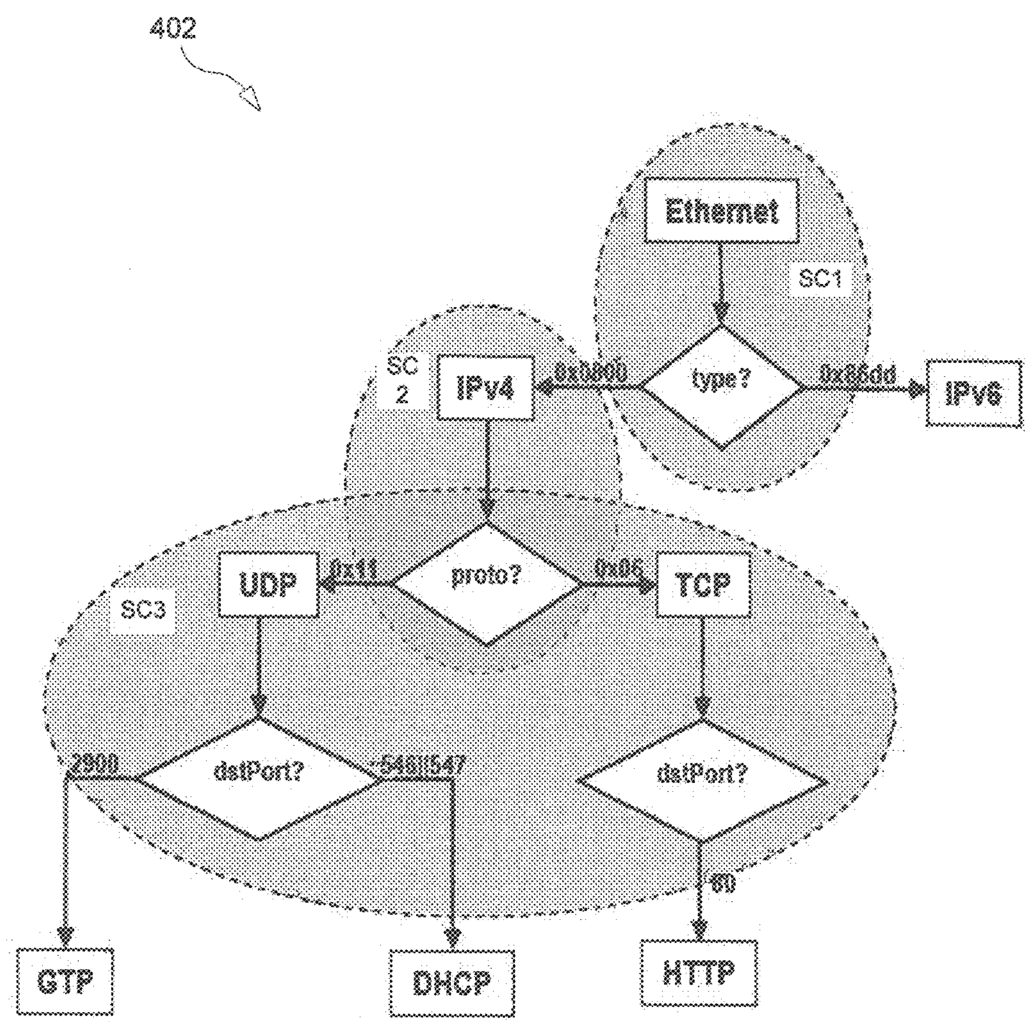
FIG. 7 illustrates combining two sub-classifiers.
Figure 8:
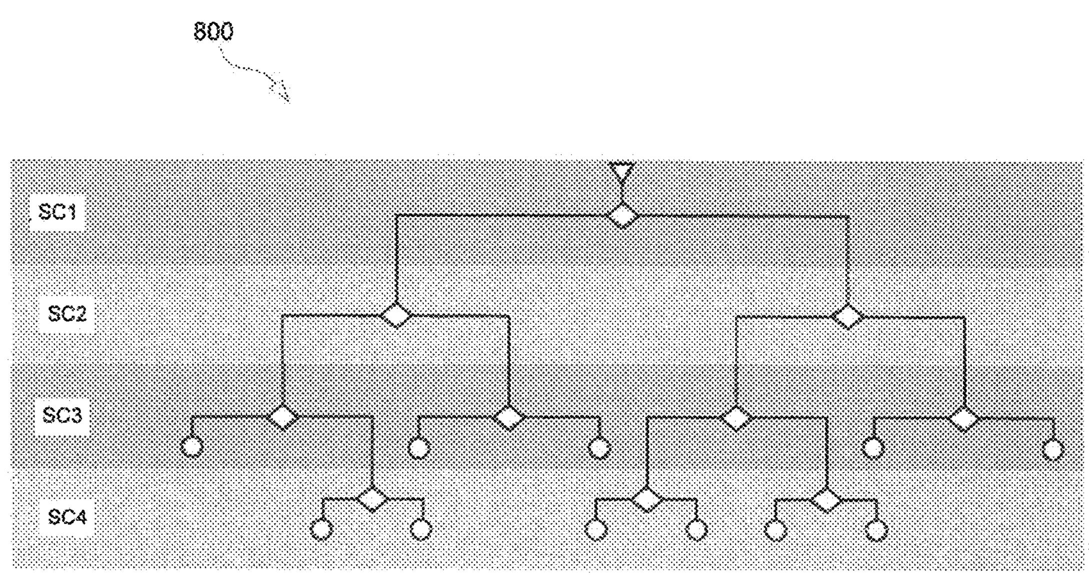
FIG. 8 illustrates a general case of classifier division
Figure 9:
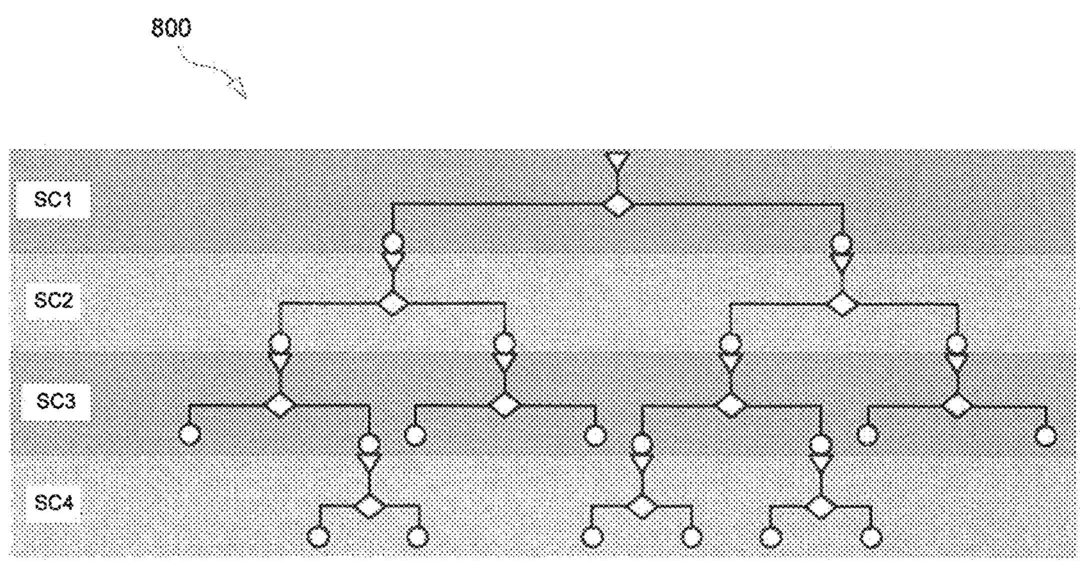
FIG. 9 illustrates classifiers modified to allow splitting

Accordingly, in some embodiments, the classifiers are cut along the levels of the tree 402, as shown in FIG. 7. Note that a packet will be sent along to the next classifier. This classifier can then handle all kinds of packets. Therefore one can simply instantiate a number of classifiers and simply load balance between them. FIG. 8 and FIG. 9 show a more general example of assigning different SCs to the different levels of a decision tree 800. The number of grouped classifiers that are put into each layer depends on the hardware used and the data-rate.

As mentioned above, special actions (e.g., packet decorating) may be performed by an SC prior to the SC sending a packet to a downstream SC. For example, referring to FIG. 8, SC1 is upstream to SC2 and, thus, SC1 after decorating a packet (e.g., adding meta-information to the packet) sends the decorated packet to SC2. The downstream SC (i.e. SC2 in this example) takes care to ensure that the correct part of the packet is inspected (e.g., SC2 uses the meta-data added to the packet to determine the protocol to which header that it is configured to parse conforms). As shown in FIG. 5, the headers each SC acts on lie in different positions in the packet. In some embodiments, the meta-data added to the packet by the upstream SC assists the downstream SC in quickly determining where the header that it needs to inspect begins.

Figure 11:
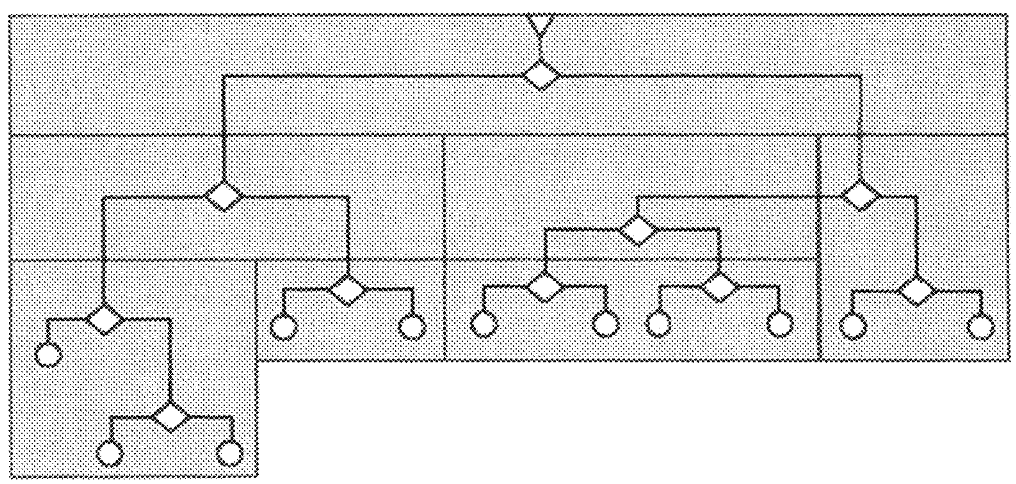
FIG. 11 illustrates a classifier with different partition types.

It is also possible to split a tree vertically, so that once an SC is done, it sends the packet to a child SC—or a cluster thereof—for further processing. This can lead to a skewed load balance if one of the outgoing branches matches more often than other. This split can be necessary if one needs to protect some classifiers from the traffic of the other. Any combination of the two can be chosen, as shown in FIG. 11, which shows a tree that is been split vertically and horizontally.

The method described above shows how to automatically spread a classifier over several processing units of some kind by: dividing the classifications task into sub-tasks; for each sub-task, creating an SC to perform the subtask; and, for each SC, allocating the SC to a particular available machine (e.g., available virtual machine). In some embodiments, the distribution algorithm is applied automatically, and in others it is combination of automatic and manual, for instance when a complex distribution pattern is necessary. Like for instance in FIG. 11.

Figure 10:
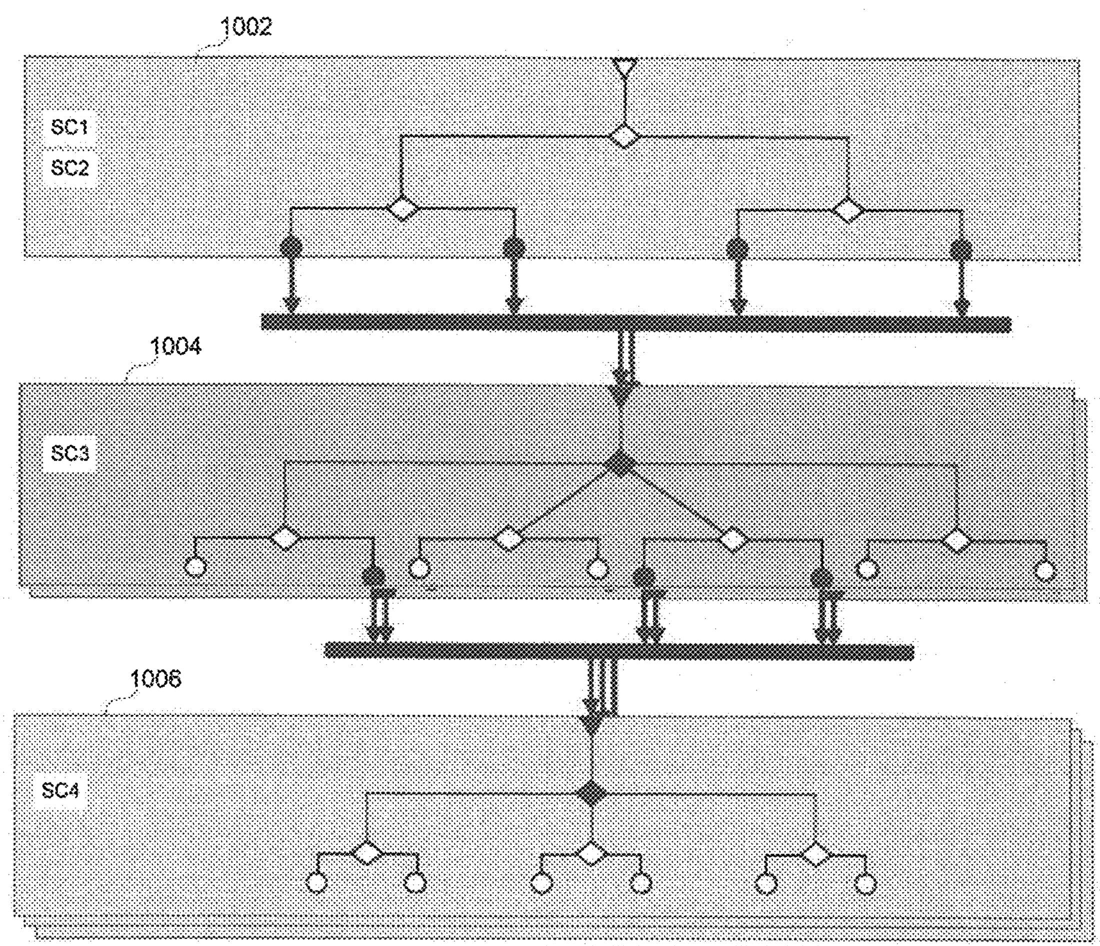
FIG. 10 illustrates classifiers optimized and split onto different hardware.
Figure 12:
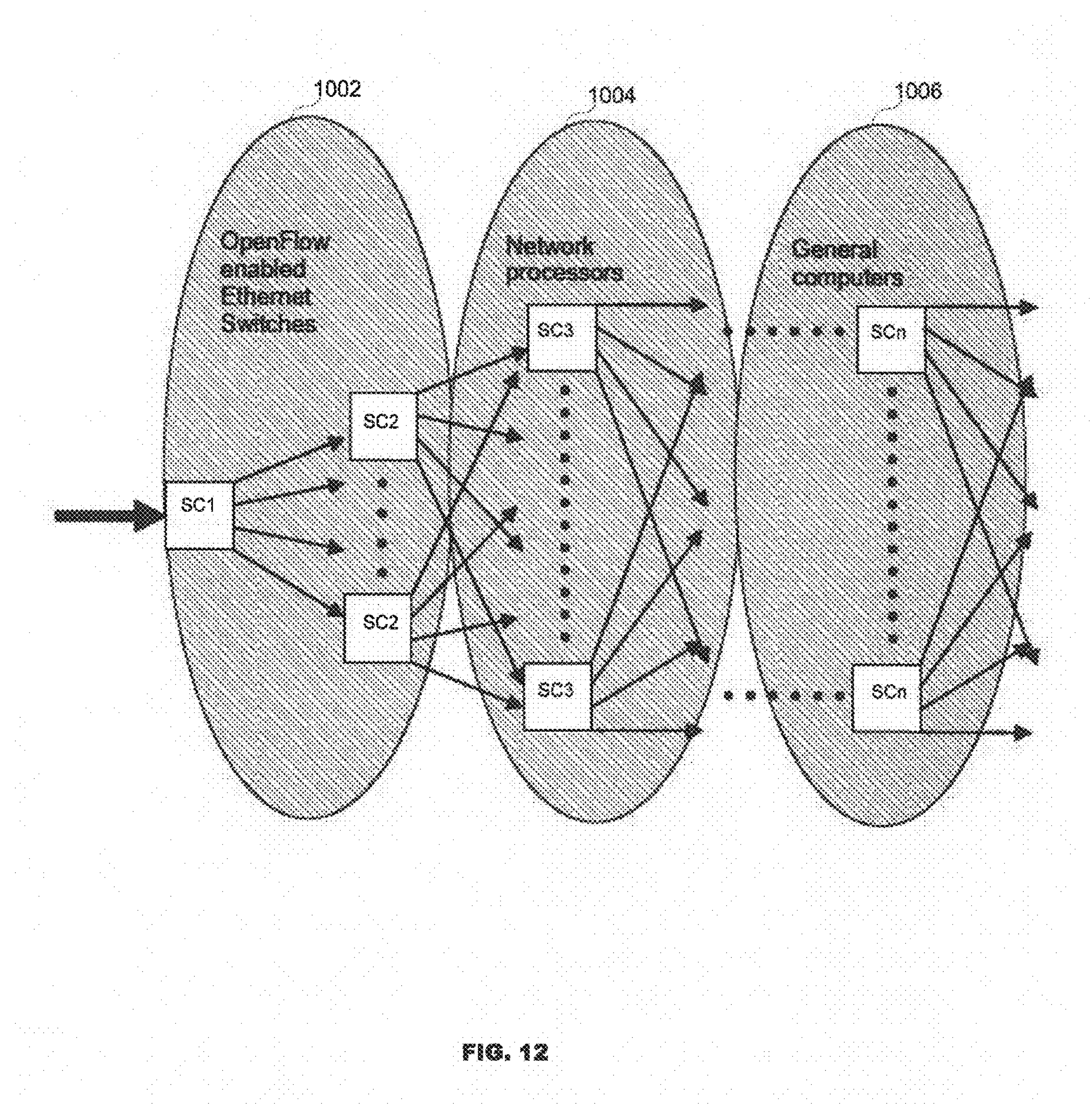
FIG. 12 illustrates a heterogonous classifier system according to some embodiments.

Furthermore, the machines to which the SC are allocated (i.e., the machines that executes the SC) can be of different kinds creating a heterogonous classification network, which is shown in FIG. 10 and FIG. 12. As shown in FIGS. 10 and 12, SC1 and SC2 are allocated to a first type of machine 1002 (e.g. switch), SC3 is allocated to a second type of machine 1004 (e.g., network processor), and SC4 is allocated to a third type of machine 1006 (e.g., general purpose computer). Furthermore, one usually deals with the lower layers of the protocol stack as quickly as possible, i.e. close to the ingress side. One can imagine that the elements deployed close to the ingress side can be simpler but more efficient. A typical such element is a hardware based Ethernet switch with simple programming capabilities—like those of an OpenFlow enabled switch.

On the other hand, when dealing with the upper layers different problems arise. The upper layer protocols are often text based (like HTTP), or even XML based (like SIP). In such cases, one may need to deploy general computers with complex software to deal with these protocols.

A Content Addressable Memory (CAM) Based Classifier:

The method for a more traditional CAM based classifier is similar whenever lookups are performed in several stages, one can split the classifier. The packet can be decorated with the result of the lookup and then transported to the next stage in a similar fashion to the decision-tree based classifier. Hence embodiments also apply to more common implementations of classifiers.

The Separation Algorithm:

A method for separating a software classifier into SCs, according to some embodiments, is described below.

(step 1) The method may begin with the step of formulating the classification task as a tree of task nodes. This can also be done for hash/TCAM-based classifiers. In some embodiments, each node in the tree should contain a singleton set containing one element.

(step 2) Next, a weight is assigned to each node according to the processing required to perform the task corresponding to the node and weights are assigned to each of the possible machines (a.k.a., processing elements).

(step 3) Next, from the root, sum up the weights assigned to the node (preferably breadth-first) until the maximum processing power of a suitable processing element is reached. All of the chosen nodes are collected into one set of nodes. For each of the children of the combined set apply step 4 recursively until no more children remain.

(4) For each set of nodes identified in step 3 create an SC corresponding to the set of nodes by: (i) creating or obtaining a set of computer instructions for performing the tasks corresponding to the tasks nodes in the set of nodes; (ii) Adding additional instructions (a.k.a., "egress code") to the set of instructions for decorating packets so that it is simple for a downstream SC to determine what classification has been performed and how deep into the packet the classification went; and (iii) Adding to the set of instructions additional instructions (a.k.a., "ingress code") for processing meta-data added to a packet by an upstream SC (e.g., instructions for determining how deep into the packet classification can continue).

(5) Allocate the set of instructions (i.e., the SC) to one or more machines.

The weight of the ingress and egress code must be subtracted from the available processing on each node. A typical value to use is the maximum available instructions per packet at line-speed. The sum of the processing need should not exceed this value. However, if the minimum possible processing needed for one classifier node does exceed the maximum allowed number of instructions per packet. This is an indication that we need to parallelize the classifier at this node.

In some embodiments, the method also includes It is also possible to further inspect each resulting SC, and if the SC is deemed simple enough, it may be allocated to a simpler network element, such as an open-flow enabled switch or possibly even a simpler switch.

Figure 13:
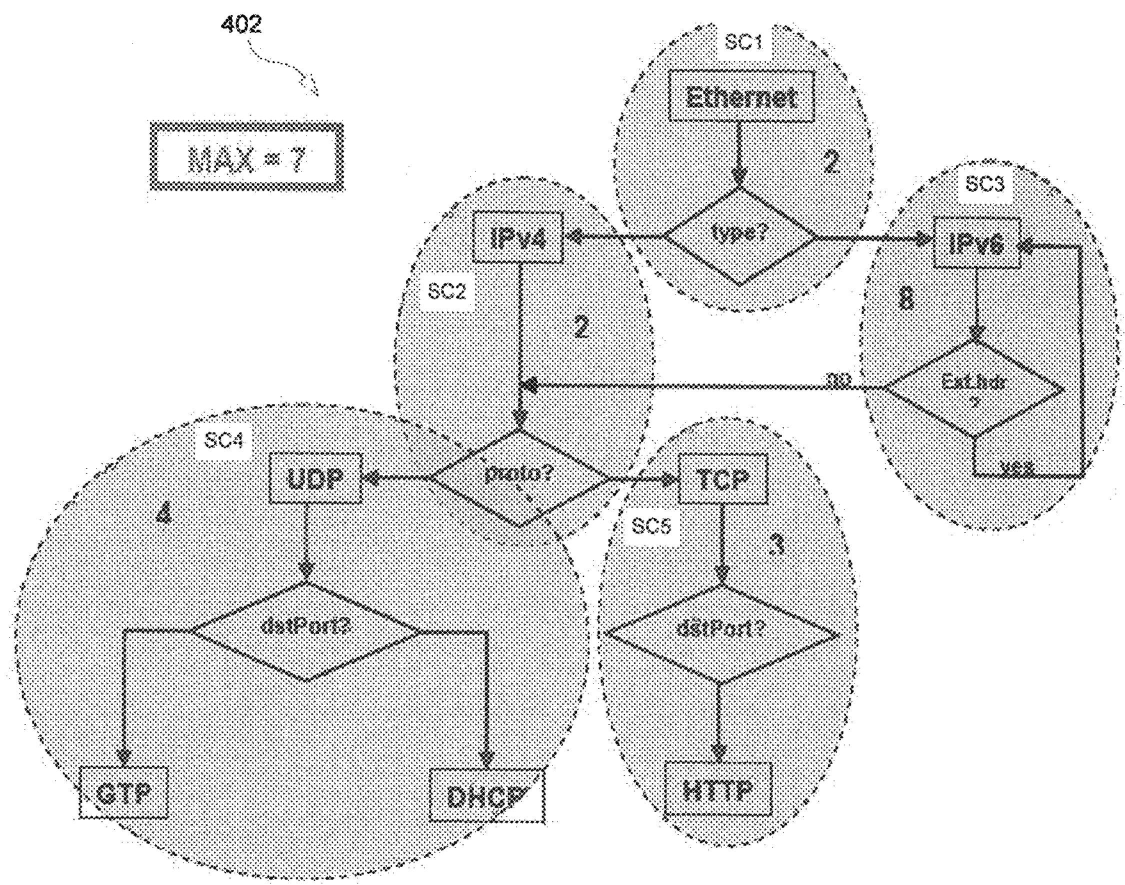
FIG. 13 illustrates weights that have been assigned to nodes in a decision tree.

Referring now to FIG. 13, FIG. 13 illustrates that weights are assigned to each SC assigned to a node of tree 402. The assigned weights are a function of the processing required (e.g., number of instructions required) to complete the tasks corresponding to the node. Each node is associated with an SC that includes all of the instructions necessary to perform the tasks associated with the node. As shown in FIG. 13, the weights assigned to each SC are as follows: SC1=2, SC2=2, SC3=8, SC4=4, SC5=3.

Figure 14:
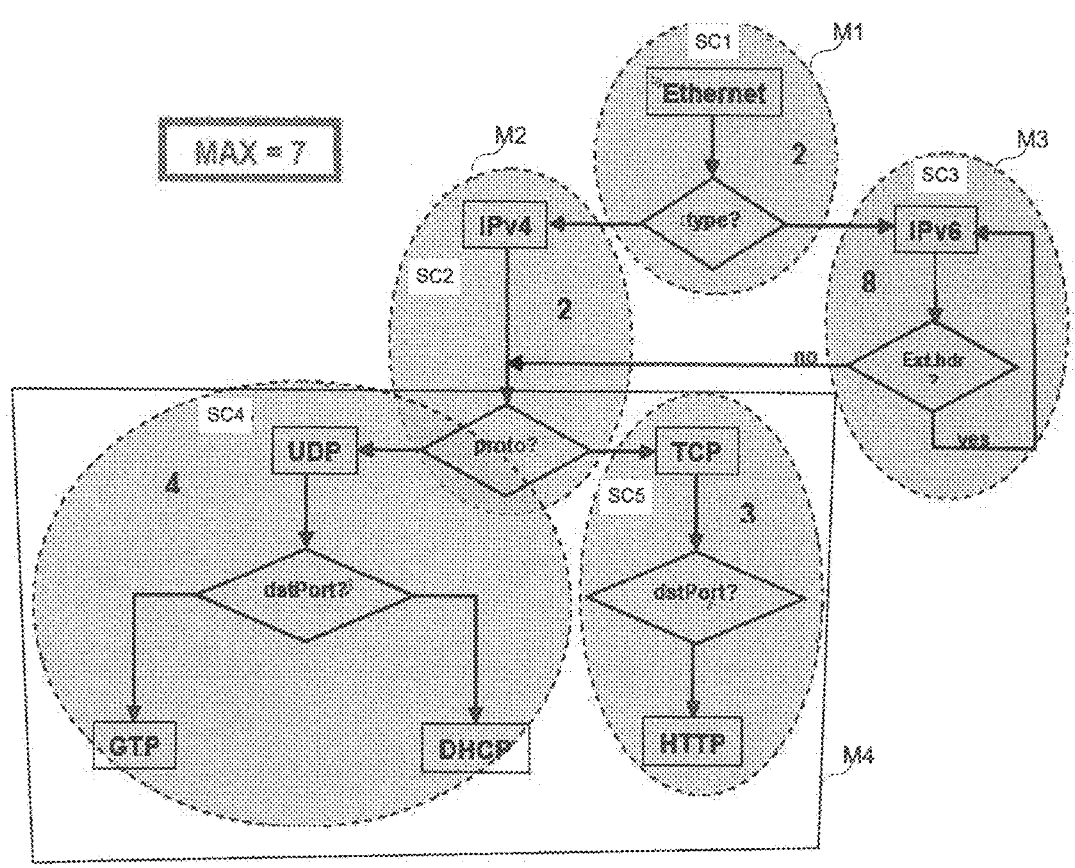
FIG. 14 illustrates a possible grouping of nodes in a decision tree.

If we assume that the weight assigned to each machine is 7, then it will be possible to combine some of the SCs to create a new SC ("SC6"). One possible solution is illustrated in FIG. 14. As illustrated in FIG. 14, SC4 and SC5 are combined to form new SC6. As further illustrated in FIG. 14, SC1 is allocated to machine M1, SC2 is allocated to machine M2, SC3 is allocated to machine M3, and the combined SC4 and SC5 are allocated to machine M4. Machines M1, M2, M3 and M4 may be of different types. For example, it might be possible to implement the M1 in switching hardware, further reducing the cost of the classifier as well as increasing the capacity of the initial stage. Note the fact that M2 exceeds the maximum processing per node and should be parallelized into two processors. This might lead to a parallelization of M2 and M3 since the relative computing (here packet forwarding) power of the element implementing M1 now is higher than the element's that implement M2 and M3.

Figure 15:
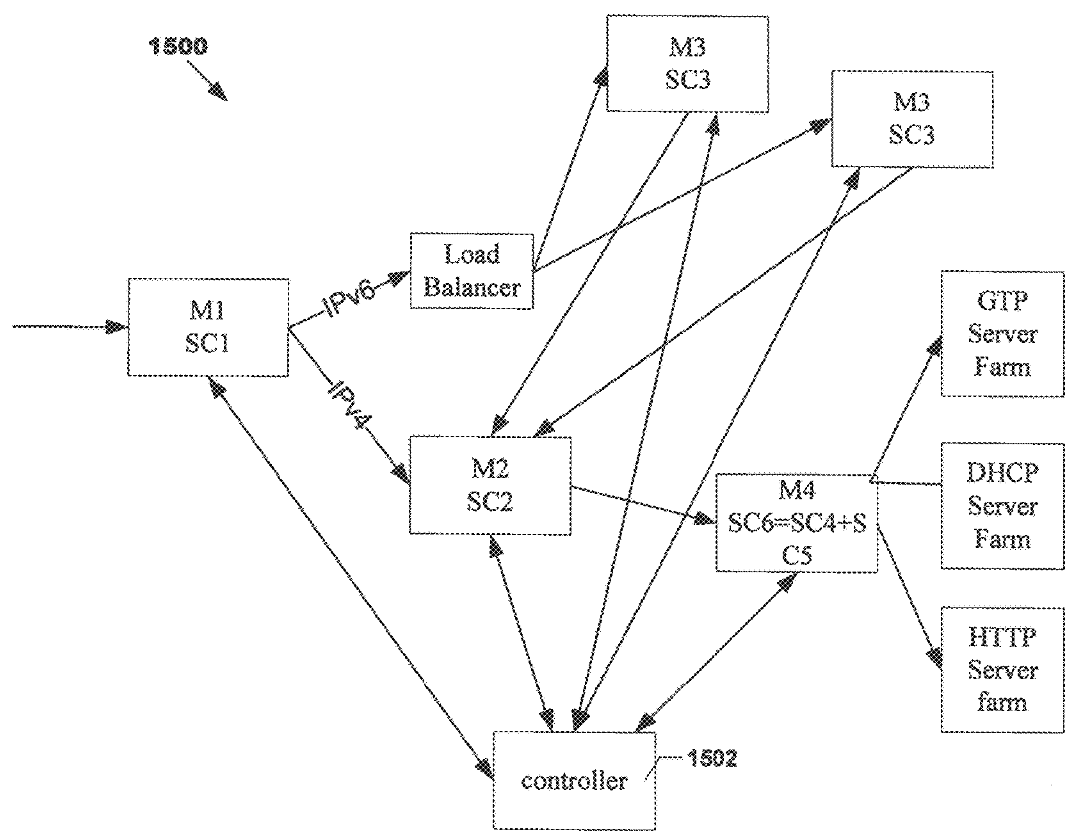
FIG. 15 illustrates a packet classification system according to some embodiments.

Referring now to FIG. 15, FIG. 15 illustrates a packet classification system 1500 comprising machines M1-M4 and a machine controller 1502 for dynamically and automatically reconfiguring the packet classification system based on the load experienced by one or more of the machines. Controller 1502 monitors the system 1500 to determine whether any changes need to be made to the system to avoid packet loss or to avoid further packet loss. For example, controller 1502 may be in communication with machines M1-M4 and may be able to determine whether the machines have reached an overload state (e.g., a state in which packets are being lost or a state in which packet buffers (a.k.a., "queues") within the machines have reached a critical level (i.e., the number of packets in the queue have reached a predetermined threshold)—such as, for example, a level where it is likely that if no action is taken, packets may be dropped from the queue or no further packets may be added to the queue). In response to detecting that a machine has reached an overload state, controller may automatically reconfigure the system 1500. For example, if machine M4 is dropping packets because the packets are arriving at machine M4 more quickly than the SCs running on machine M4 can process the packets, then controller may reconfigure the system 1500.

Figure 16:
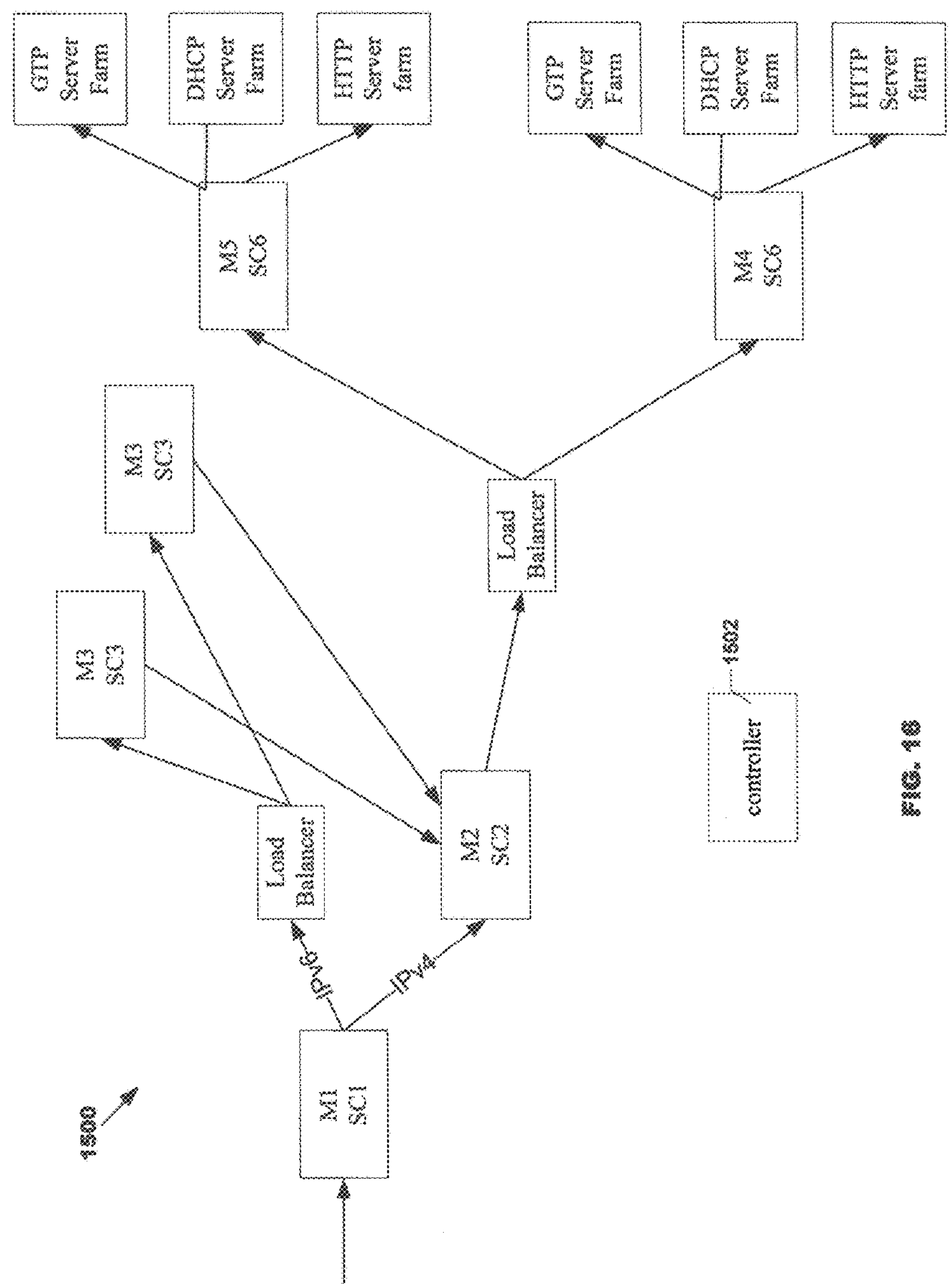
FIG. 16 illustrates one way in which the controller may reconfigure the packet classification system.
Figure 17:
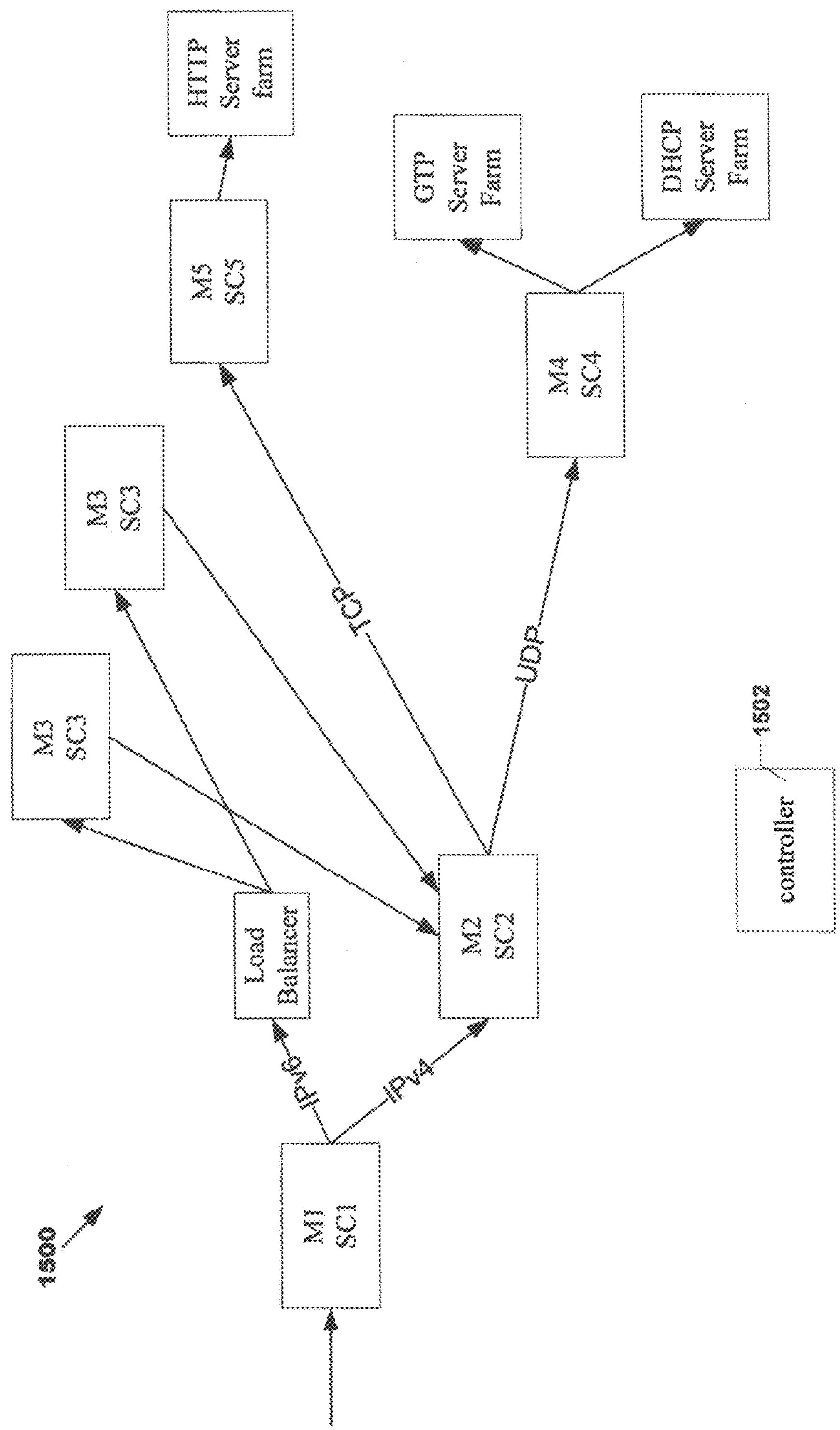
FIG. 17 illustrates another way in which the controller may reconfigure the packet classification system.

For example, in this scenario, controller 1502 could instantiate a new machine M5 and a new load balancer as shown in FIG. 16. Further controller may allocate to M5 SC6 (SC4+SC5). In this way, the load on machine M4 can be reduced. As another example, controller could instantiate a new Machine M5, de-allocate SC6 (SC4+SC5) from machine M4, allocate SC4 to machine M4 and allocate SC5 to machine M5, thereby potentially reducing the load on machine M4 (see FIG. 17).

In some embodiments, system 1500 may include a set of machines that are in an inactive, stand-by mode. Thus, in such an embodiment, controller may instantiate a machine by causing the machine to transition to an active mode. Additionally, controller may allocate to such a machine an SC by transmitting one or more files containing the SC to the newly instantiated machine and instruct the machine to execute the SC.

When such a new machine is instantiated by the controller, the controller may update configuration data stored and used by an existing machine. For example, with respect to FIG. 17, part of the process of instantiating the new machine M5 may include the controller updating configuration data used by SC2 in determining where to send packets that have been processed. For instance, the configuration data may include a table that maps protocols to machines. So, for example, the configuration data used by SC2 may be updated by controller 1502 to include a table entry that maps the protocol TCP to machine M5 (e.g., Machine M5's MAC address) and to include an entry that maps the protocol UDP to machine M4. As another example, with respect to FIG. 16, the process of instantiating new machine M5 may include the controller updating configuration data used by machine SC2 so that the configuration data will instruct SC2 to forward packets to the new load balancer rather than to Machine M4.

Figure 18:
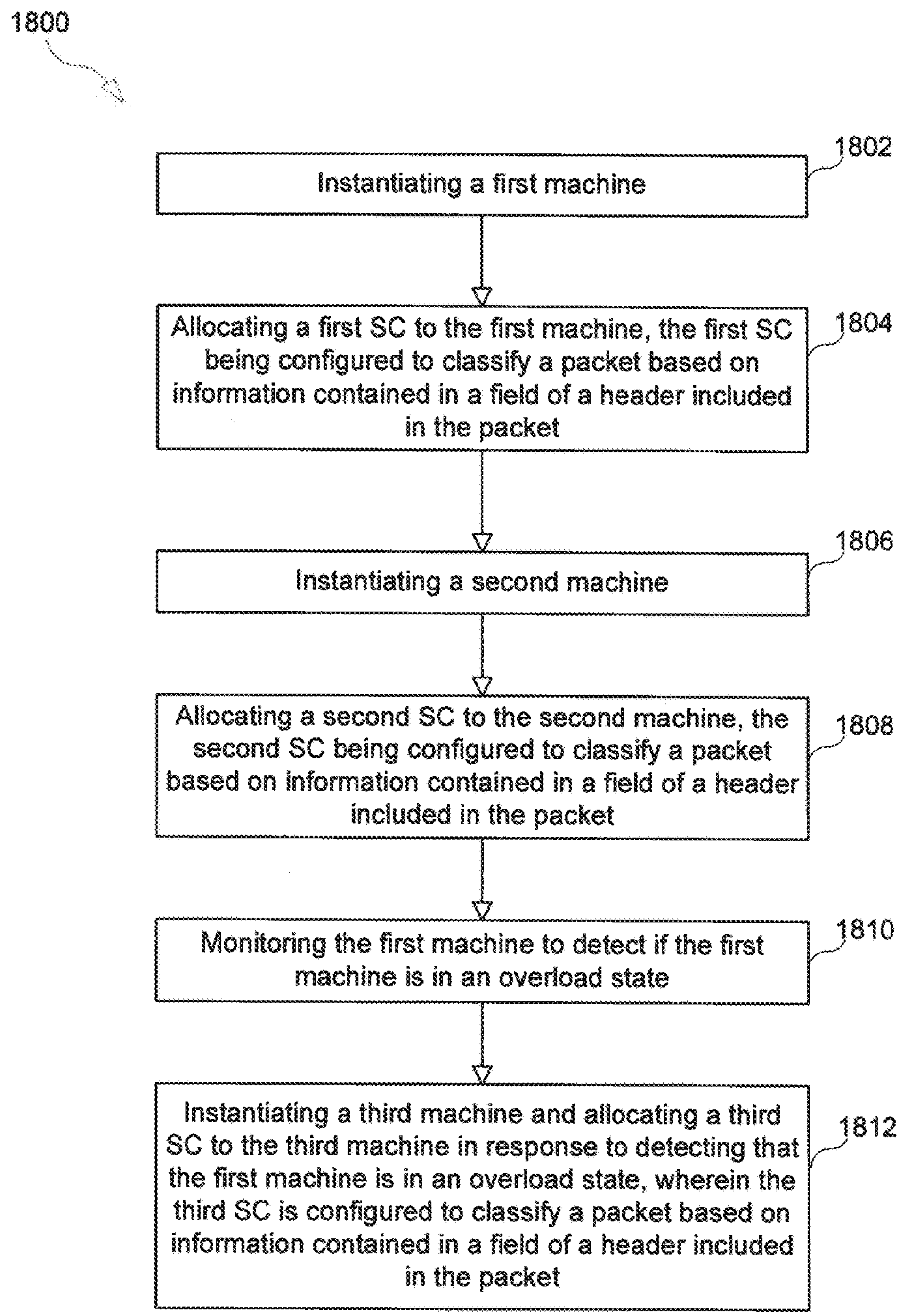
FIG. 18 is a flow chart illustrating a process according to some embodiments.

Referring now to FIG. 18, FIG. 18 is a flow chart illustrating a process 1800 according to some embodiments. Process 1800 may be being in step 1802, where controller 1502 instantiates a first machine (e.g., a virtual machine, switch, router, computer). In step 1804, controller 1502 allocates a first sub-classifier (SC) to the first machine, the first SC being configured to classify a packet based on information contained in a field (e.g., a port field, protocol field, etc.) of a header (e.g., a TCP, UDP, or Ethernet header) included in the packet (e.g., an Ethernet frame or an IP packet—e.g. IPv4 or IPv6). In step 1806, controller 1502 instantiates a second machine. In step 1808, controller 1502 allocates a second SC to the second machine, the second SC being configured to classify a packet based on information contained in a field of a header included in the packet. In step 1810, controller 1502 monitors the first machine to detect if the first machine is in an overload state. In step 1812, controller 1502 instantiates a third machine and allocates a third SC to the third machine in response to detecting that the first machine is in an overload state, wherein the third SC is configured to classify a packet based on information contained in a field of a header included in the packet.

In some embodiments, the process 1800 further comprises the first machine receiving a packet and the first SC processing the packet, wherein the processing comprises decorating the packet to create a decorated packet. The first SC then provides the decorated packet to the second SC.

In some embodiments, the third SC allocated to the third machine is a copy of the first SC.

In some embodiments, process 1800 also includes the step of controller 1502 instantiating a load balancer in response to detecting that the first machine is in an overload state, wherein the load balancer is configured to balance traffic between the first machine and the third machine, and the SC allocated to the third machine is a copy of the first SC.

In some embodiments, the process 1800 further includes controller 1502 updating configuration data used by an SC that is upstream with respect to the first SC in response to detecting that the first machine is in an overload state, wherein the configuration data is used by the upstream SC for routing packets to downstream SCs.

Figure 19:
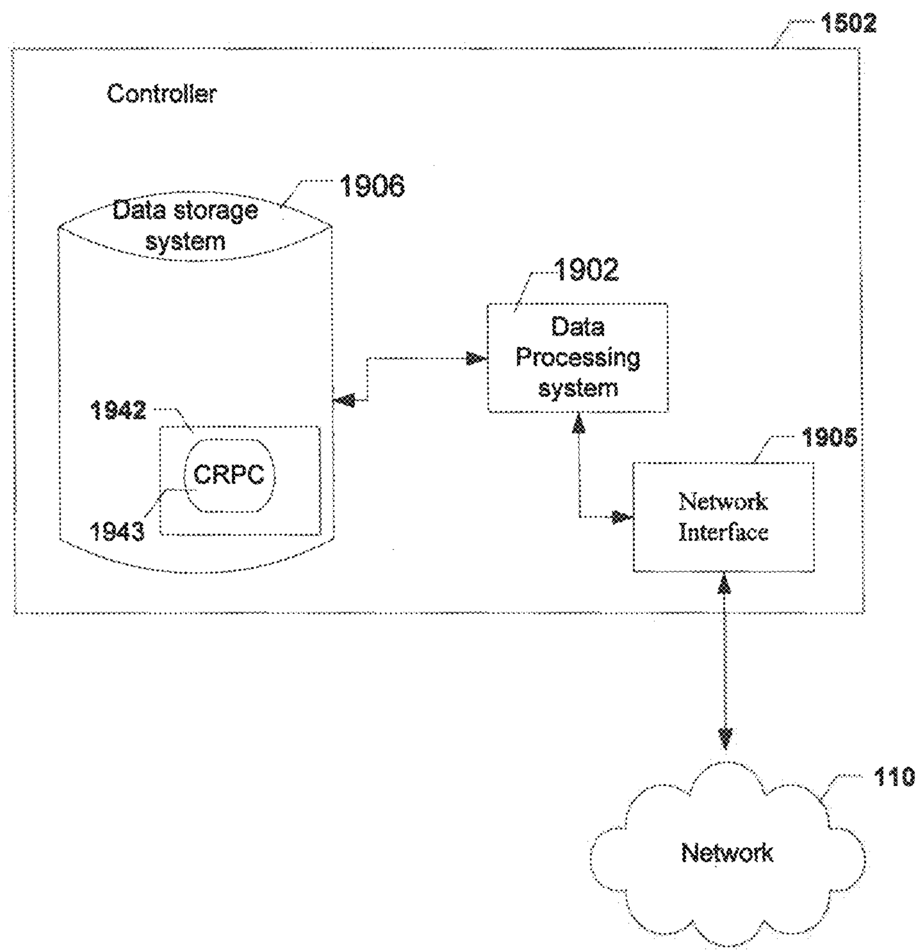
FIG. 19 illustrates a block diagram of a controller according to some embodiments.

Referring now to FIG. 19, FIG. 19 illustrates a block diagram of a controller 1502 according to some embodiments. As shown in FIG. 19, controller 1502 may include: a data processing system 1902, which may include one or more data processing devices each having one or more processors (e.g., microprocessors) and/or one or more circuits, such as an application specific integrated circuit (ASIC), Field-programmable gate arrays (FPGAs), etc; a data storage system 1906, which may include one or more non-transitory computer-readable mediums, such as non-volatile storage devices and/or volatile storage devices (e.g., random access memory (RAM)); and a network interface 1905 for connecting controller 1502 to a network (e.g. a local area network) to which machines M1-M5 are connected, thereby enabling controller 1502 to communicate with and monitor the machines.

In embodiments where data processing system 1902 includes a processor, a computer program product may be provided, which computer program product includes: computer readable program code 1943 (software), which implements a computer program, stored on a non-transitory computer readable medium 1942, such as, but not limited, to magnetic media (e.g., a hard disk), optical media (e.g., a DVD), memory devices (e.g., random access memory), etc. In some embodiments, computer readable program code 1943 is configured such that, when executed by data processing system 1902, code 1943 causes the controller 1502 to perform the steps described herein. In other embodiments, controller 1502 may be configured to perform steps described herein without the need for code 1943. For example, data processing system 1902 may consist merely of specialized hardware, such as one or more application-specific integrated circuits (ASICs). Hence, the features of the present invention described above may be implemented in hardware and/or software. For example, in some embodiments, the functional components of controller 1502 described above may be implemented by data processing system 1902 executing computer instructions 1943, by data processing system 1902 operating independent of any computer instructions 1943, or by any suitable combination of hardware and/or software.

Advantages:

At least some of the embodiments have one or more of the following advantages:

The method described is automated—at least to a large extent. This relieves the implementer from many difficult choices of for instance where the classifier should be split and using what method.

Employing methods described herein, one should see a reduced time to market for new product and a reduced number of error reports from delivered products.

Automation allows for a much greater flexibility of deployments, since the deployment can be recalculated automatically when requirements change. This is useful in for instance cloud environments, as well as in any product that scale up or down on demand.

The flexibility provided by the controller described above leads to better hardware utilization and capacity. Because a deployment can easily be changed, there is no need to over-provision a classifier to meet future needs.

Without this flexibility, one must define only a few possible deployments for different capacities, since each must be tested individually. With methods describe here, a large number of possible deployments exist, out of which only a few need to be tested.

The methods described here give an implementer great freedom to choose how to proceed with the realization of the classifier. One can use the automated method relieving the implementer from the task of distributing function over the element. Conversely one can plan and lay out the classifier manually—possibly with the help of the method to plan an efficient distribution.

Conclusion:

While various embodiments have been described above, it should be understood that they have been presented by way of example only, and not limitation. Thus, the breadth and scope of this disclosure should not be limited by any of the above-described exemplary embodiments. Moreover, any combination of the above-described elements in all possible variations thereof is intended to be encompassed unless otherwise indicated herein or otherwise clearly contradicted by context.

Additionally, while the processes described above and illustrated in the drawings are shown or described as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for packet classification, the method comprising:

instantiating a first machine for executing instructions, wherein the first machine is operable to provide a first amount of computing power for use by one or more software elements that require computing power and the first machine comprises a first packet buffer for storing packets;

allocating to the first machine a first sub-classifier (SC) comprising a first set of instructions, wherein the first machine is configured to execute the first set of instructions, the first set of instructions being configured to cause the first machine to classify a packet based on information contained in a field of a header included in the packet, and the first SC being configured to require not more than a second amount of computing power, wherein the second amount of computing power is not greater than the first amount of computing power;

instantiating a second machine for executing instructions, wherein the second machine is operable to provide a third amount of computing power for use by one or more software elements that require computing power and the second machine comprises a second packet buffer for storing packets;

installing on the second machine a second SC comprising a second set of instructions for execution by the second machine, the second set of instructions being configured to cause the second machine to classify a packet based on information contained in a field of a header included in the packet;

detecting that the first machine is in an overload state; and as a direct result of detecting that the first machine is in an overload state, instantiating a third machine comprising a third packet buffer for storing packets and a third SC, the third SC being configured to cause the third machine to classify a packet based on information contained in a field of a header included in the packet, wherein detecting that the first machine is in an overload state comprises at least one of: i) detecting that the first machine is dropping packets and ii) detecting that the number of packets stored in the first packet buffer within the first machine has reached a threshold, the method further comprises instantiating a traffic load balancer in response to detecting that the first machine is in an overload state, the traffic load balancer is configured such that, in response to receiving a network packet, the traffic load balancer i) uses a load balancing method to select one of the first machine and the third machine and ii) forward the network packet to the selected machine, thereby balancing network traffic between the first machine and the third machine, and the third SC allocated to the third machine is a copy of the first SC.

2. The method of claim 1, further comprising:

the first machine receiving a packet;

the first SC processing the packet, wherein the processing comprises classifying the packet and decorating the packet to create a decorated packet; and the first SC providing the decorated packet to the second SC, wherein decorating the packet to create a decorated packet comprises adding to the packet meta-data comprising information identifying a protocol to which a header of the packet conforms.

3. The method of claim 1, wherein the third SC allocated to the third machine is a copy of the first SC.

4. The method of claim 1, wherein the first SC comprises a fourth SC and a fifth SC, the third SC allocated to the third machine is a copy of the fifth SC, and the method further comprises de-allocating the fifth SC from the first machine in response to detecting that the first machine is in an overload state.

5. The method of claim 1, wherein the first machine separate and distinct from the second machine, the first machine is a first virtual machine, the second machine is a second virtual machine, and the third machine is a third virtual machine that is separate and distinct from the first and second virtual machines.

6. The method of claim 1, wherein the first machine is separate and distinct from the second machine, the first machine is one of a switch, router, and general purpose computer, and the second machine is one of a switch, router, and general purpose computer.

7. The method of claim 1, further comprising, in response to detecting that the first machine is in an overload state, updating configuration data used by an upstream SC that is upstream with respect to the first SC, wherein the configuration data is used by the upstream SC for routing packets to downstream SCs.

8. A controller for packet classification, the controller being adapted to:

instantiate a first machine for executing instructions, wherein the first machine is operable to provide a first amount of computing power for use by one or more software elements that require computing power, and wherein the first machine comprises a first packet buffer for storing packets and a first sub-classifier (SC) comprising a first set of instructions for execution by the first machine, the first set of instructions being configured to cause the first machine to classify a packet based on information contained in a field of a header included in the packet, and the first SC being configured to require not more than a second amount of computing power, wherein the second amount of computing power is not greater than the first amount of computing power;

instantiate a second machine for executing instructions, wherein the second machine is operable to provide a third amount of computing power for use by one or more software elements that require computing power, and wherein the second machine comprises a second packet buffer for storing packets and a second sub-classifier (SC) comprising a second set of instructions for execution by the second machine, the second set of instructions being configured to cause the second machine to classify a packet based on information contained in a field of a header included in the packet, and the second SC being configured to require not more than a fourth amount of computing power, wherein the fourth amount of computing power is not greater than the third amount of computing power; and detect whether the first machine is in an overload state, wherein the first SC comprises a fourth SC and a fifth SC, the controller is further configured such that, as a direct result of detecting that the first machine is an overload state, the controller instantiates a third machine comprising a third packet buffer for storing packets and allocate a third SC to the third machine, wherein the third SC is configured to classify a packet based on information contained in a field of a header included in the packet and the third SC allocated to the third machine is a copy of the fifth SC, the controller is configured to detect that the first machine is in an overload state by performing one or both of: i) detecting that the first machine is dropping packets and ii) detecting that the number of packets stored in the first packet buffer within the first machine has reached a threshold, the controller is further configured such that, as a direct result of detecting that the first machine is an overload state, the controller reconfigures the first SC by removing the fifth SC from the first SC so that the first SC comprises the fourth SC but does not comprise the fifth SC.

9. The controller of claim 8, wherein:

the first machine is adapted to receive a packet;

the first SC is adapted to classify the packet and decorate the packet to create a decorated packet; and the first SC is further adapted to provide the decorated packet to the second SC, wherein decorating the packet to create a decorated packet comprises adding to the packet meta-data comprising information identifying a protocol to which a header of the packet conforms.

10. The controller of claim 8, wherein the third SC allocated to the third machine is a copy of the first SC.

11. The controller of claim 8, wherein the controller is further adapted to:

instantiate a traffic load balancer in response to detecting that the first machine is in an overload state, wherein the traffic load balancer is configured such that, in response to receiving a network packet, the traffic load balancer i) uses a load balancing method to select one of the first machine and the third machine and ii) forward the network packet to the selected machine, thereby balancing network traffic between the first machine and the third machine, and the third SC allocated to the third machine is a copy of the first SC.

12. The controller of claim 8, wherein the first machine is a virtual machine.

13. The controller of claim 8, wherein the first machine is one of a switch, router, and general purpose computer.

14. The controller of claim 8, wherein the controller is further adapted to update configuration data used by an upstream SC that is upstream with respect to the first SC in response to detecting that the first machine is in an overload state, wherein the upstream SC is adapted to use the configuration data for routing packets to downstream SCs.

15. A computer program product for packet classification, the computer program product comprising a non-transitory computer readable medium storing computer readable program code, the computer readable program code comprising:

code for instantiating a first machine for executing instructions, wherein the first machine is operable to provide a first amount of computing power for use by one or more software elements that require computing power, and wherein the first machine comprises a first packet buffer for storing packets and a first sub-classifier (SC) comprising a first set of instructions for execution by the first machine, the first set of instructions being configured to cause the first machine to classify a packet based on information contained in a field of a header included in the packet, and the first SC being configured to require not more than a second amount of computing power, wherein the second amount of computing power is not greater than the first amount of computing power;

code for instantiating a second machine for executing instructions, wherein the second machine is operable to provide a third amount of computing power for use by one or more software elements that require computing power, and wherein the second machine comprises a second packet buffer for storing packets and a second sub-classifier (SC) comprising a second set of instructions for execution by the second machine, the second set of instructions being configured to cause the second machine to classify a packet based on information contained in a field of a header included in the packet, and the second SC being configured to require not more than a fourth amount of computing power, wherein the fourth amount of computing power is not greater than the third amount of computing power;

code for detecting whether the first machine is in an overload state;

code for instantiating a third machine comprising a third packet buffer for storing packets; and code for allocating a third SC to the third machine in response to detecting that the first machine is in an overload state, the third SC being configured to classify a packet based on information contained in a field of a header included in the packet, wherein the first SC comprises a fourth SC and a fifth SC, the third SC allocated to the third machine consists of the fifth SC, the code for detecting that the first machine is in an overload state comprises one or both of: i) code for detecting that the first machine is dropping packets and ii) code for detecting that the number of packets stored in the first packet buffer within the first machine has reached a threshold, and the program code further comprises code for reconfiguring the first SC in response to the code for monitoring detecting that the first machine is in an overload state, wherein reconfiguring the first SC comprises removing the fifth SC from the first SC such that the first SC comprises the fourth SC but does not comprise the fifth SC.

16. The computer program product of claim 15, wherein:

the first machine is adapted to receive a packet;

the first SC is adapted to classify the packet and decorate the packet to create a decorated packet; and the first SC is further adapted to provide the decorated packet to the second SC, wherein decorating the packet to create a decorated packet comprises adding to the packet meta-data comprising information identifying a protocol to which a header of the packet conforms.

17. The computer program product of claim 15, wherein the program code further comprises:

code for instantiating a traffic load balancer in response to the code for monitoring detecting that the first machine is in an overload state, wherein the traffic load balancer is configured such that, in response to receiving a network packet, the traffic load balancer i) uses a load balancing method to select one of the first machine and the third machine and ii) forward the network packet to the selected machine, thereby balancing network traffic between the first machine and the third machine, and the third SC allocated to the third machine is a copy of the first SC.

18. A method for packet classification, the method comprising:

instantiating a first machine for use in a packet classification system;

instantiating a second machine for use in the packet classification system;

the first machine receiving a first packet comprising a first header of a first type, a second header of a second type, and a payload;

the first machine classifying the first packet based solely on information included in the first header of the first packet;

the first machine, after classifying the first packet, providing to the second machine at least a portion of the first packet, said portion of the first packet comprising the second header and the payload;

the second machine receiving said at least a portion of the packet and classifying said at least a portion of the packet based on information included in the second header;

detecting that the first machine is in an overload state;

in response to detecting that the first machine is in an overload state, instantiating a traffic load balancer and a third machine for use in the packet classification system, said traffic load balancer being configured such that, in response to receiving a network packet, the traffic load balancer i) uses a load balancing method to select one of the first machine and the third machine and ii) forward the network packet to the selected machine, thereby balancing network traffic between the first machine and the third machine;

after instantiating the traffic load balancer and the third machine for use in the packet classification system, the traffic load balancer receiving a second packet comprising a first header of the first type;

the traffic load balancer, in response to receiving the second packet, choosing one of the first machine and the third machine;

after choosing one of the first and third machines, the traffic load balancer sending the second packet to the chosen machine;

the chosen machine classifying the second packet based on information included in the first header of the second packet; and the chosen machine, after classifying the second packet, providing to the second machine at least a portion of the second packet.

19. A method for packet classification, the method comprising:

instantiating a first machine for use in a packet classification system;

instantiating a second machine for use in the packet classification system;

the first machine receiving a first packet comprising a first header of a first type, a second header of a second type, and a payload;

the first machine generating meta-data for the first packet based on information included in the first header of the first packet, wherein the first machine is configured to provide to the second machine the meta-data and at least a portion of the first packet regardless of the information included in the first header of the first packet;

the first machine, after generating the meta-data for the first packet, providing to the second machine the meta-data and at least a portion of the first packet, said portion of the first packet comprising the second header and the payload;

detecting that the second machine is in an overload state;

in response to detecting that the second machine is in an overload state, instantiating a third machine for use in the packet classification system and reconfiguring the first machine such that the first machine is configured to choose between the second machine and the third machine based on information contained in a first header of a packet;

after instantiating the third machine for use in the packet classification system, the reconfigured first machine receiving a second packet comprising a first header of the first type and a second header of the second type, wherein the reconfigured first machine is reconfigured to choose between the second machine and the third machine based on information contained in the first header of the second packet;

the reconfigured first machine obtaining the information included in the first header of the second packet;

the reconfigured first machine, after obtaining the information from the first header of the second packet, selecting a destination for the second packet based on the information obtained from the first header of the second packet, wherein selecting the destination comprises choosing one of the second machine and the third machine based on the information obtained from the first header of the second packet; and the reconfigured first machine providing to the selected destination at least a portion of the second packet, said portion of the second packet comprising the second header and the payload of the second packet.

* * * * *